June 26, 1962 J. O. EAMES 3,040,845
LIQUID-COOLED FRICTIONAL MECHANISM
Filed Jan. 2, 1959 2 Sheets-Sheet 1
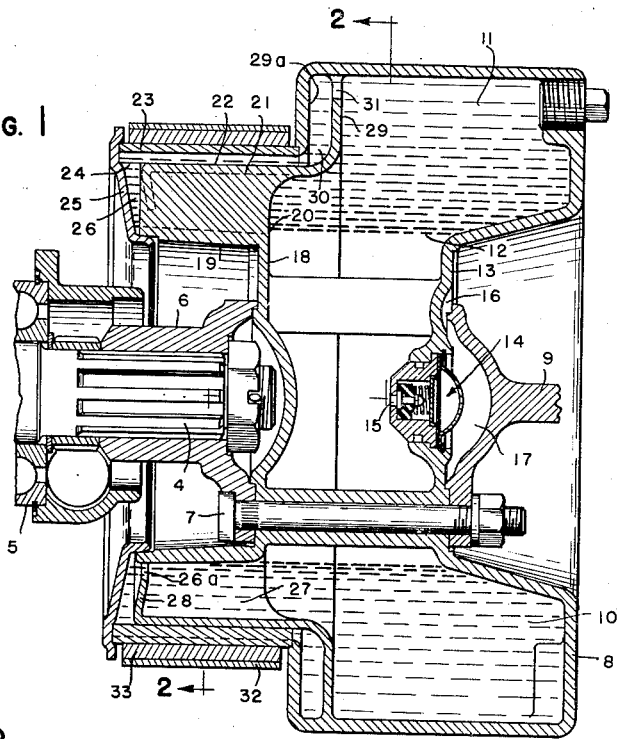
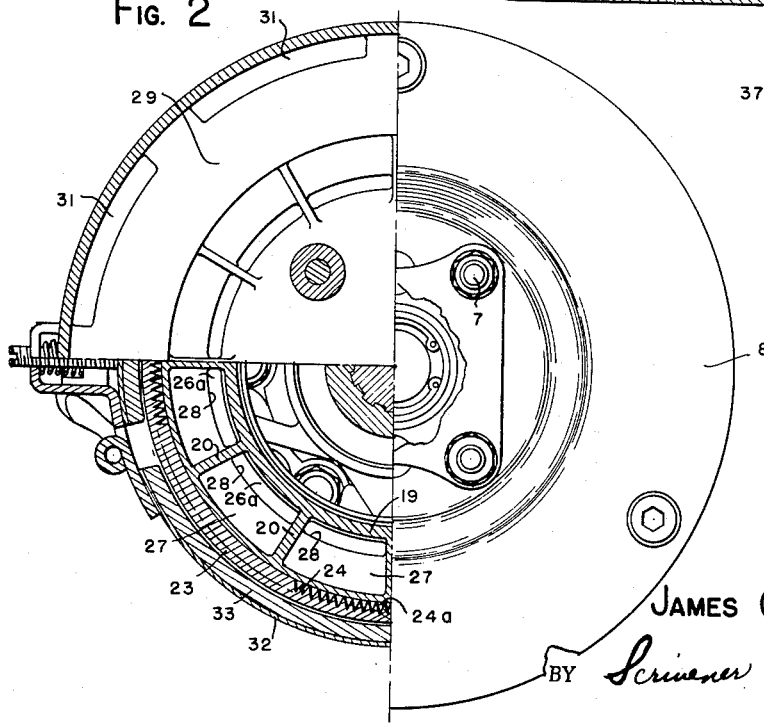
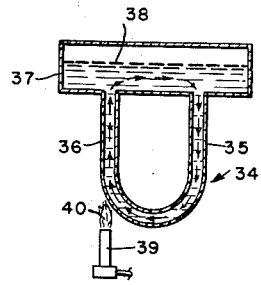
INVENTOR
JAMES OWEN EAMES
BY Scrivener & Parker
ATTORNEY June 26, 1962   J. O. EAMES   3,040,845
LIQUID-COOLED FRICTIONAL MECHANISM
Filed Jan. 2, 1959   2 Sheets-Sheet 2

INVENTOR
JAMES OWEN EAMES
BY Scrivener + Parker
ATTORNEY

United States Patent Office 3,040,845
Patented June 26, 1962

3,040,845
LIQUID-COOLED FRICTIONAL MECHANISM
James Owen Eames, Washington, Conn. (P.O. Box 400, Seymour, Conn.), assignor to Roy S. Sanford, Wilfred A. Eaton and Erling D. Sedergren, all of Woodbury, Conn., and Roger H. Casler and James O. Eames, both of Washington, Conn.
Filed Jan. 2, 1959, Ser. No. 784,664
5 Claims. (Cl. 188—264)

This invention relates to frictional mechanisms, hereinafter referred to as brake mechanisms, and more particularly to brake and clutch mechanisms of the liquid cooled type.

For the purposes of this specification, clutch and brake mechanisms are considered to be in the same category.

The excessive heat developed in friction brake mechanisms has caused great difficulties in the past, and it is accordingly one of the objects of the invention to provide means for overcoming these difficulties.

Another object of the invention is the provision of novel brake cooling means.

Yet another object of the invention is the provision of brake mechanism of the above type, wherein liquid cooling means is self contained in the brake mechanism.

A further object of the invention is to provide brake mechanism of the above type, wherein the cooling liquid is automatically circulated in the brake mechanism.

A still further object of the invention is the provision of means for controlling the pressure of liquid in the brake mechanism.

Another object of the invention is the provision of a novel brake drum having self-contained liquid cooling means.

Still another object of the invention is the provision of means for cooling the liquid in the brake mechanism.

A further object of the invention is the provision of mechanism of the above type particularly adapted to brakes of the external contracting type.

These and other objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings, wherein similar reference characters are utilized throughout the several views, FIG. 1 is a side elevational view in section of a brake mechanism constructed in accordance with the principles of the invention;

FIG. 2 is a partial sectional view of the mechanism of FIG. 1 taken from the right along line 2—2;

FIG. 3 is a diagrammatic view illustrating the principle of liquid circulation utilized in the mechanism of FIG. 1.

Figure 4:
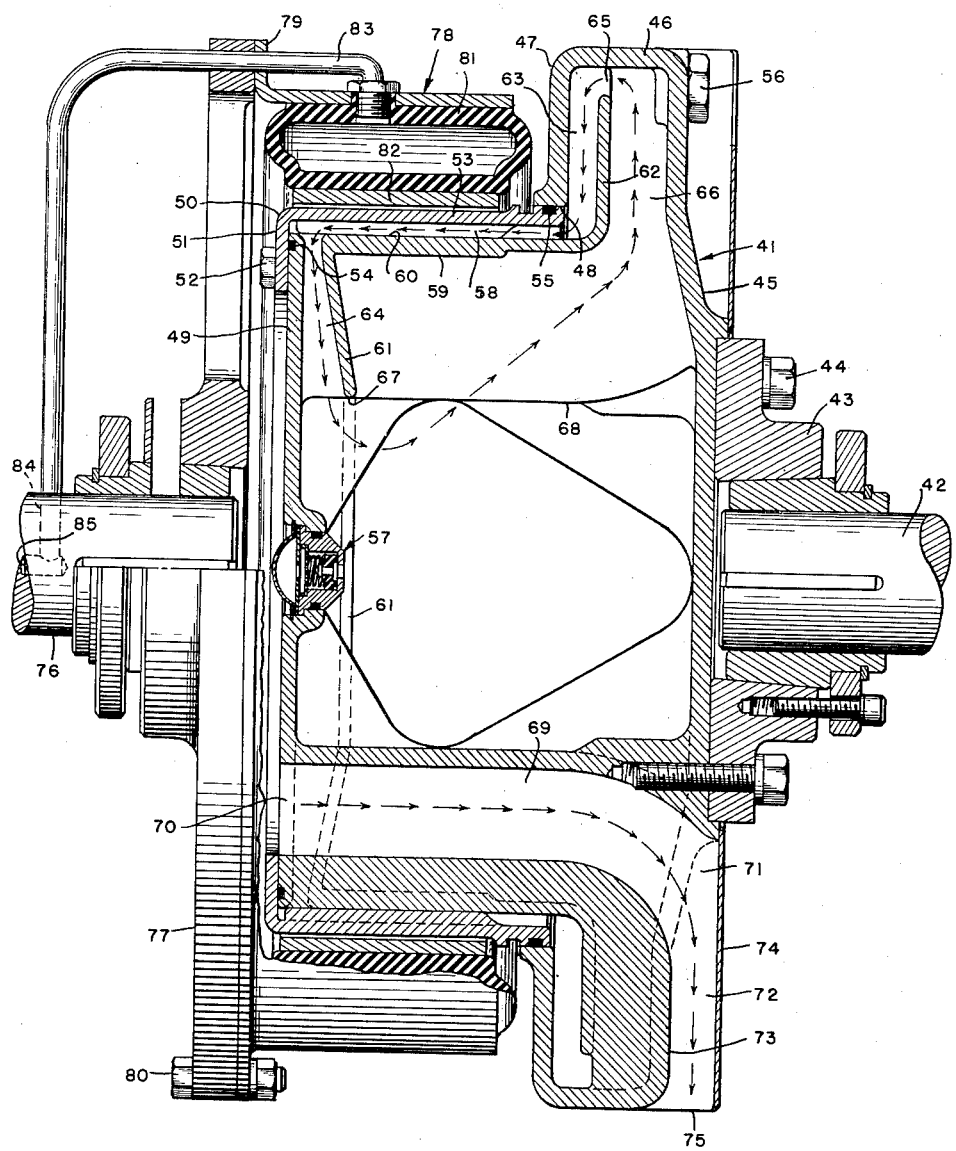
FIG. 4 is a side elevational view in section of a modification of the invention.

Although the matter of liquid cooling for vehicle brakes and brakes and clutches of other types has received considerable attention in the past, many of the systems proposed have involved considerable piping or plumbing, and have also required the use of a circulating pump of some sort to circulate the cooling liquid through the mechanism. It has been found that in many cases, however, adequate cooling may be provided by using a properly constructed brake drum or wheel having a chamber for cooling liquid therein which is self-contained in the brake drum without any outside liquid circulating connections, and with provision being made for thermo-siphon circulation of the cooling liquid within the drum in order to transmit the heat of braking to the entire body of liquid in the drum as well as to the entire metal structure of the drum. Such mechanisms are particularly adaptable to industrial and other uses, wherein a brake is applied periodically or a clutch is engaged periodically, with a rest period between engagements which allows dissipation of the heat from the cooling liquid and from the metal of the drum to the surrounding atmosphere. Although the construction set forth in the present application is particularly adapted to installation as a drive shaft brake on a vehicle or as a clutch, it will be understood by those skilled in the art that the invention is also adapted to other types of brakes without limitation as to the exact configuration or arrangement of the mechanism. The invention is particularly adapted to brakes and clutches of the external contracting type, wherein the drum having an external cylindrical friction surface is engaged by a brake band or brake shoes which are moved radially into frictional engagement with the external friction surface of the drum.

In its broad aspect, the invention contemplates a hollow brake drum having a cooling liquid therein adapted to be circulated by thermo-siphon action, together with an external contracting brake band or shoe adapted to engage an external cylindrical friction surface formed on a portion of the drum. Although the brake drum may be preferably constructed in such a manner as to include a separate metallic friction element engageable by the brake shoe and formed of a metal particularly adapted for the intended service, it will be understood that the metallic friction element above referred to may be formed, if desired, as an integral part of the brake drum structure without departing in any way from the spirit of the invention. In the event a separate friction element is utilized, however, it has been found that substantially pure copper or silver and some of the high conductivity alloys thereof are extremely satisfactory for such service, as they not only have exceptional wear characteristics when utilized in connection with the proper type of low heat conductivity composition lining, but also serve to conduct heat rapidly from the friction surface to the cooling liquid in order to prevent overheating of the drum friction surface and the adjacent brake lining.

Referring more particularly to FIG. 1, the mechanism may include a shaft 4 rotatably mounted in a suitable bearing 5, a hub 6 being secured to the shaft for rotation therewith as shown. The hub is attached as by means of bolts 7 to a brake drum member 8 preferably formed of a relatively high conductivity metal such as aluminum, although it is to be understood that other metals may be utilized if desired. A second shaft 9 is attached to the right end of the drum member 8 as shown, and the shafts 4 and 9 may be considered as portions of the drive shaft of a vehicle. One of the shafts may be connected to the engine of the vehicle or to the vehicle transmission, and the other shaft may be connected to the differential in the rear axle. The right hand portion of the member 8 includes a large cylindrical reservoir portion 10, which may contain a quantity of cooling liquid 11, the volume of the liquid being such that with the drum member rotating and the liquid thrown outward therein by centrifugal force, the level of the liquid is generally in the region indicated by the numeral 12. A wall 13 is formed at the right end of the reservoir, and a relief valve mechanism 14 is provided in the wall, preferably located on the center line of the member 8, the relief valve being set to relieve the pressure in the chamber 10 when it reaches a predetermined value, through a discharge port 15. In order to permit the escape of steam or vapor released by the relief valve, an atmospheric port 16 is provided in the wall 13 connected with chamber 17 formed between the hub of shaft 9 and the wall 13 of the reservoir.

The left end of the reservoir 10 is defined by a wall 18 extending outwardly from the center, and an annular wall 19 spaced radially outward from the axis and extending to the left axially from the wall 18. Radial fins or ribs 20 extend outward from the wall 19 as shown more particularly in FIG. 2, these ribs merging at their outer ends with an annular drum supporting wall 21. This wall has an outer cylindrical surface 22 formed thereon, and in the embodiment shown, a separate friction drum element 23, preferably formed of copper or silver or alloys thereof, is mounted on the surface 22 and is supported thereon by means of V-shaped generally axial teeth 24 formed on the drum element, the peaks of the teeth, being in supporting engagement with the surface 22, and the valleys between the teeth forming axial passages for cooling liquid 24a as will be hereinafter described. The left end of the wall 19 is connected to the left end of the friction element 23 by means of an annular ring 25 which may be secured to the wall 19 and to the left end of the element 23 by welding, brazing, or by any other suitable means, it being noted that an annular passage or passages 26, through ports 26a, connect the valleys between the teeth at their left ends with passages 27 formed between the spokes 20, these passages connecting at their right ends with the annular liquid reservoir 10. In addition, the passages 26 are further defined by a continuous annular web or ring 28 connecting the spokes 20 and serving to direct the flow of liquid inwardly towards the center of the mechanism as it passes through the passages 26. The right end of the wall 21 merges into a radially outward extending wall 29, spaced from a wall portion 29a of the drum member, thus forming a radial liquid passage or passages 30 connected at the inner end thereof with the passages 24a between the teeth on the element 23, and connected at the outer end thereof, with the outermost portion of the reservoir 10 through passages 31 in the wall 29, it being noted that the passages 31 are spaced radially outward from the friction element 23.

An external contracting brake shoe 32 is positioned on the outside of the element 23 in a conventional manner, and this brake band carries a preferably non-metallic heat insulating lining 33 as shown, this lining being adapted on constraction of the band by suitable mechanism, not shown, to frictionally engage the outer surface of the element 23.

As heretofore stated, the reservoir 10 is preferably filled with an amount of cooling liquid such that when the member is rotated at a speed sufficient to throw the liquid to the outer portion of the drum due to centrifugal force, the liquid assumes the level along the lines indicated by the numeral 12. In any case, the inner periphery of the annular web 28 should be covered. As the brake band is applied, the friction element 23 is heated and imparts its heat to the liquid in the valleys 24a between the teeth on the element, and this liquid becomes lighter than the cooler liquid in the reservoir 10. In this connection, it is to be understood that if desired, the inner surface of the friction drum element may be cylindrical, with the supporting teeth formed on the drum member 8 and extending outward from the cylindrical surface 22, or the element may be otherwise supported.

In the ordinary tea kettle, for example, the water heated at the bottom of the kettle becomes lighter and rises to the top, while the cooler water, due to its greater weight, descends to the bottom of the kettle and is heated and recirculated. The flow, however, is uncontrolled and the liquid moving upward interferes with the downwardly moving liquid. In the present mechanism, the coolant in the valleys between the teeth becomes lighter as it is heated and flows toward the center of the drum, which in this case, due to centrifugal force, corresponds to the top of the tea kettle, and flows through the annular passage 26, through the axial passages 27 and into the reservoir in the more central portion thereof. Due to the fact that the passage 30 extends radially outward an appreciable distance from the junction of this passage with the valleys 24a, the pressure due to centrifugal force is greater in this passage than it is in the valleys, and consequently the heated liquid follows the easiest path through the passage 26 rather than trying to flow outward through the passage 30 and back into the reservoir through the ports 31. Consequently, the arrangement is such that a definite direction of thermo-siphon circulation of the cooling liquid is established automatically as soon as heat is imparted to the element 23 by the operation of the brake. Since the surface of the member 8 is exposed to atmosphere over a large area, the liquid in this member is cooled to a considerable degree, and the cooled liquid is thrown toward the outside of the reservoir 10 and flows from there through the ports 31 radially inwardly through the passage 30 and through the valleys between the teeth of the element 23.

As shown, the relief valve 14 is preferably positioned on the axis of the member 8 or at least closely adjacent the axis, and consequently, unless the reservoir 10 is filled with an unusually large volume of liquid, the construction is such that when the member 8 is not rotating, the liquid level will be below the port 15, and even though the pressure rises above the pressure for which the relief valve is set, nothing can escape through the port 15 and the relief valve except vapor or steam, thus serving to conserve the supply of liquid in the reservoir 10. In the event the valve opens to relieve the pressure when the drum is rotating at any appreciable speed, it will be understood that all of the liquid is thrown outwardly to the outermost portion of the drum by centrifugal force, and that consequently no liquid can escape from the valve except in the form of vapor or steam.

In further explanation of the principle involved in the circulation of the liquid in the mechanism just described, reference is had to FIG. 3, wherein a U-tube 34 has vertical legs 35 and 36 connected to a common reservoir 37 at the upper end thereof, the reservoir being filled with liquid to a level indicated by the numeral 38. A burner 39 is shown, and the burner is so placed that frame 40 imparts heat to the U-tube at the left of the center line. This heats the liquid in the U-tube leg 36, and this liquid becoming lighter rises in the tube as shown by the arrow into the reservoir 37, the liquid then circulating across the reservoir to the right and being cooled, and due to its being cooler and therefore heavier, flowing downward through the leg 35 and back to the source of heat at the flame 40. If the U-tube were heated at the exact center of the U at the bottom, the direction of flow would be indeterminate, and the heated and lighter liquid would tend to flow equally through both of the legs 36 and 35, while the cooler liquid in the reservoir 37 would have to flow downward in both of the tubes past the rising heated liquid, thus seriously impeding the thermo-siphon flow which occurs with the arrangement shown. Relating this to the structure of FIG. 1, it will be noted that in effect, the radially outermost portion of the reservoir 10 constitutes one half of the U-tube, while the rest of the U-tube is comprised of the annular passage 30, the valleys 24a at which point the heat is applied, the annular passage 26, and the axial passages 27 which complete the circuit to the reservoir. Consequently the heat is applied in the same manner as shown in FIG. 3 at a location positioned radially inward from the outermost portion of the circuit, and consequently the liquid when heated by a brake application is forced to flow inwardly from the valleys 24a of the element 23, through the annular passages 26 and ports 26a, and back to the reservoir through the axial passages 27.

As heretofore stated, this arrangement for circulating the cooling liquid is particularly adapted for use in a brake or clutch of the external contracting band or shoe type, as in order to definitely establish the proper direction of coolant flow whenever the brake is applied, it is necessary that the reservoir for cooling liquid be of greater diameter than the brake drum friction element to which the friction band is applied, as otherwise the direction of the flow set up would be indeterminate and inefficient or impeded circulation would result. In the arrangement of the invention, however, the cooling liquid flows from a portion of the reservoir spaced radially outward from the heated surface of the brake drum element inwardly toward that surface, and thence into the more central portion of the reservoir, where it is cooled and recirculated as above described. This is in accordance with the principles set forth in FIG. 3.

Referring now to FIG. 4 of the drawings, a modification of the invention is shown. Although the drawing shows a clutch mechanism, it will be understood by those skilled in the art that the mechanism shown may be readily adapted for use as a brake mechanism without departing in any way from the principles of the invention. As will be described, the embodiment shown in FIG. 4 includes means for more efficiently cooling the liquid in the rotating drum.

As shown, the mechanism includes a drum member 41 secured to a shaft 42 by means of a hub 43, the hub being secured to the member 41 as by means of bolts 44. The shaft 42 is the driving shaft for the clutch, and may be connected to a suitable drive motor, not shown. The drum member 41 includes a wall 45 at the right end thereof, a generally cylindrical outer wall 46, an annular wall 47 extending inwardly from the left end of the wall 46 and having a cylindrical bore 48 formed at the inner periphery of the wall 47, together with an end wall 49 which serves to close the left end of the drum member, the wall 49 as shown being spaced axially from the wall 45. A cup shaped friction drum element 50 is provided with a flange 51 secured to the left face of the wall 49 as by means of cap screws 52, the element having a cylindrical portion 53 extending to the right from the wall 49 and having the right end thereof in sliding engagement with the bore 48 at the inner periphery of the wall 47. Sealing rings 54 and 55 serve to prevent leakage between the drum friction element and the drum member. It will be seen from the foregoing that this construction provides a hollow drum having a large capacity for cooling liquid, this liquid being put into the drum through a suitable filler plug 56. In order to provide for a discharge of vapor or steam from the interior of the drum when the pressure exceeds a certain value, a relief valve mechanism 57 is mounted in the left wall 49 of the drum, preferably being mounted on the center line of the drum for reasons already explained in connection with the structure shown in FIG. 1. If desired, the internal surface of the drum friction element 53 may be provided with generally axial teeth 58 which serve to support the drum friction element as will be further described.

In the mechanism of the above type, it is important to provide for a directed flow of liquid along the inner surface of the drum friction element in order to provide efficient cooling, and in order to transmit heat from the drum friction element to the cooling liquid and from the cooling liquid to the metal of the rotatable drum member. To this end, partition or baffle means are provided in the drum member, and as shown in the upper portion of FIG. 4, this baffle or partition is Z-shaped in cross section, the baffle including a cylindrical portion 59 having an outer cylindrical surface 60 formed thereon and spaced from the inner surface of the drum friction element 53, and inwardly extending continuous annular wall 61, and an outwardly extending continuous annular wall 62 at the right end of the partition. In the embodiment shown, the peaks of the teeth 58 are in supporting engagement with the cylindrical surface 60 of the partition, but it will be understood that in the event the teeth are not considered necessary for the support of the drum friction element, they may be omitted, in which case the entire inner surface of the drum friction element is spaced from the outer surface 60 of the partition portion 59 to provide a passage for cooling liquid from one end to the other of the friction drum element along the inner surface thereof.

As shown, the annular wall 62 is spaced from the right side of the annular wall 47, thus providing an annular passage 63 for cooling liquid which extends radially outward from the right end of drum friction element 50. The operation of the Z-shaped partition can best be visualized by assuming for the moment that the walls 61 and 62 are continuous annular walls connected by a continuous cylindrical wall 59 extending around the drum and having the cross sectional shape shown, the inner periphery of the wall 61 and the outer periphery of the wall 62 being spaced as shown radially outward from the axis from the drum member. Thus, the walls 49 and 61, which are spaced apart, provide an annular cooling liquid passage 64 extending radially inward from the surface of the drum friction element at the left end thereof toward the center, while the walls 47 and 62 provide the continuous annular passage 63 extending radially outward from the right end of the drum friction element. At the outer periphery of the wall 62, a passage or passages 65 are provided connecting the annular passage 63 with an annular passage 66 formed between the walls 62 and 45 and in unrestricted communication with the inner portion of the hollow drum. The hollow drum is filled with a quantity of liquid sufficient to fully cover the inner periphery 67 of the wall 61 when the drum member is rotating at a speed sufficient to throw the liquid into the outer portion of the drum due to the action of centrifugal force. Thus, again considering for the moment that the walls 61 and 62 are continuous and symmetrical with relation to the axis of the drum member, it will be seen that liquid can flow outwardly from the central portion of the drum member through the passage 66, thence into the passage 63 through the passage or passages 65 at the extreme outer portion of the drum member, thence to the left between the inner surface of the drum friction element 50 and the cylindrical surface 60 of the wall 59 and thereafter radially inwardly into the central portion of the drum through the annular passage 64 formed between the walls 49 and 61. Since, as above described, the inner periphery 67 of the wall 61 is covered at all times by cooling liquid when the drum member is rotating at any appreciable speed, the liquid flowing inward through the passage 64 mingles with the liquid in the reservoir portion of the drum and being cooled, flows outwardly again as above described.

When the drum friction element 50 is heated due to operation of the clutch or brake, it will be apparent that the liquid between the inner surface of the element and the cylindrical surface 60 of the wall 59 will be heated and will therefore become lighter. Due to centrifugal force, however, the pressure on the liquid in the passage 63 is greater than that in the space between the drum friction element and the wall 60, and therefore the heated liquid will tend to flow to the left between the drum friction element and the wall surface 60 and thence inwardly into the central portion of the drum member through the annular passage 64. At the same time, the liquid in the main hollow portion of the drum will be cooled by dissipating heat through the walls of the drum member and will be thrown outward by centrifugal force through the passage 66 and into the passage 63 through the passage or passages 65. Thus, as heated liquid flows from the space between the drum friction element and the surface 60, it will be replaced by cooler liquid through the passage 63.

During the description immediately preceding, it has been assumed for purposes of clarity that the walls 61 and 62 are continuous annular walls extending around the drum and having their peripheries concentric with the axis of the drum member. Actually, the wall 61 is not continuous, but is interrupted by a plurality of bosses 68 extending from the wall 49 to the wall 45, and having air ducts 69 formed therein, these air ducts serving as tubes to conduct cooling air through the portion of the drum member which contains the cooling liquid. One of these bosses and the corresponding air duct is shown in section in the lower portion of FIG. 4, and it will be understood that additional bosses and air ducts are circumferentially spaced about the drum in symmetrical relationship, the walls of each duct being exposed to the liquid in the drum member and the flow of air through the ducts serving to cool the liquid which engages the duct walls. It will be noted that the ducts 69 are provided at their left ends with openings 70, and at their right ends with openings 71 spaced radially outward from the openings 70. The openings 71 open into an annular air space 72 formed between a wall 73 on the drum member and a plate or baffle 74 secured to the drum member in a suitable manner for rotation therewith. Thus the ducts 69 communicate with atmosphere in a region adjacent the central portion of the drum member at the left end thereof, and communicate with atmosphere at the extreme outer periphery of the drum at the right end thereof, the plate 74 and the wall 73 forming an exhaust opening or openings 75 at said outer periphery. Thus we have a centrifugal blower which serves to force a stream of cooling air through the ducts 69 whenever the drum member is rotating. Since these ducts pass through the portion of the drum member containing the cooling liquid, heat is transmitted from the cooling liquid through the walls of the ducts into the air flowing through the ducts and is effectively dissipated to atmosphere, thus enabling the cooling liquid to be lowered in temperature more rapidly during and following a brake or clutch application.

The remaining portion of the mechanism is conventional, including a shaft 76 adapted to be driven by the clutch, this shaft being secured to a plate or disc 77 for rotation therewith as shown. An expander tube actuating mechanism 78 of conventional nature is provided, this including a cylindrical carrier 79 secured to the disc 77 by means of bolts 80, and an expander tube 81 secured to the inner surface of the carrier, and brake lining elements 82 secured to the inner surface of the expander tube. Provision is made for supplying fluid under pressure to the expander tube in order to effect engagement of the elements 82 with the friction drum element, this means including a tube 83 connected to a passage 84 in the shaft 76, this passage being connected to a passage 85 in the center of the shaft adapted to be supplied with fluid under pressure through a suitable seal of conventional type, not shown. When fluid under pressure is supplied to the expander tube, the brake lining elements 82 engage the outer surface of the drum friction element 50, thus causing the shaft 76 to rotate with the shaft 42. The heat developed during this engagement is imparted to the cooling liquid in the drum member, and the liquid circulates by thermo-siphon action as above described, the heat imparted to the liquid, being in turn imparted to the metal of the brake drum member and to the surrounding air, the dissipation of heat from the metal of the brake drum member being facilitated materially by the flow of air through the ducts 69 as heretofore described.

It will be understood from the foregoing description that a novel construction is provided wherein the liquid cooled frictional mechanism is entirely self-contained, and wherein, due to the inclusion of a liquid circulating circuit so constituted that a directed thermo-siphon circulation is assured, the circulation is positive and always occurs in the proper direction, thus insuring efficient operation and transfer of heat to the cooling liquid and to the metal structure of the hollow drum, while the blower arrangement dissipates the heat to atmosphere. This is accomplished without moving parts or unnecessary structure, and the heat reservoir capacity of the mechanism can be readily increased or decreased by changing the liquid capacity of the drum member. Although copper and silver and some of the high conductivity alloys thereof are considered to be desirable materials for the formation of the drum friction element, it will be understood that other metals may be utilized depending upon the type of service desired, and it will also be understood that the drum friction element may be in some cases be formed integrally with the drum member. Due to the ability of cooling liquids such as water to store heat, this ability being greater than that of a corresponding weight of metal, it will be understood that a large heat-sink or reservoir capacity may be provided in a mechanism of this type, and that such a mechanism is particularly adapted for operations wherein there is an opportunity between brake or clutch applications for heat to be dissipated to the surrounding atmosphere from the metal of the rotating drum.

Although the invention has been illustrated and described herein in considerable particularity, it is to be understood that the invention is not to be considered as limited thereto, but may be embodied in other forms as may well suggest themselves to those skilled in the art. Reference will, therefore, be had to the appended claims for a definition of the limits of the invention.

What is claimed is:

1. Liquid cooled frictional mechanism including a rotatable drum member having a generally annular cooling liquid reservoir therein of relatively large diameter, a cylindrical brake drum portion of smaller diameter than the reservoir having an external friction surface adapted to be engaged by an external contracting brake band to generate heat at said surface and an opposite internal surface adapted to be engaged by a cooling liquid, said heat passing through the drum to said internal surface and being transferred to said liquid, and cooling liquid passage means in said drum member connected at one end with substantially the radially outermost portion of said reservoir and at the other end with a portion of the reservoir spaced radially inward from said internal surface, said passage means being so positioned as to direct cooling liquid axially along said internal surface and including a portion extending axially along substantially said entire internal surface, an annular radial portion extending outwardly from one end of said axial portion to substantially the radially outermost portion of said reservoir, and a second annular radial portion extending inwardly from the other end of said axial passage portion to a portion of the reservoir spaced radially inward from said internal surface.

2. Liquid cooled frictional mechanism as set forth in claim 1, wherein at least one cooling air duct is included in the rotatable drum member extending through said reservoir and having walls exposed therein, said duct having a connection with atmosphere at one end thereof adjacent the outer periphery of the drum member and a connection with atmosphere at the other end thereof in a region spaced radially inward from said outer periphery of the drum member.

3. Liquid-cooled frictional mechanism including a rotatable drum member having a generally annular portion of relatively large diameter, a friction drum portion of appreciably smaller outside diameter than said annular reservoir portion spaced axially from said drum portion and having an external friction surface adapted to be engaged by a friction member and an opposite internal surface adapted to be engaged by a cooling liquid, and baffle means in said drum member, said baffle means forming, in connection with said member, a Z-shaped cooling liquid passage extending from substantially the radially outermost region of said annular reservoir portion to a region of the reservoir spaced radially inward from said internal surface, said baffle serving to direct the flow of cooling liquid from the outermost portion of said reservoir radially inward toward said internal surface.

4. Liquid-cooled frictional mechanism as set forth in claim 3, wherein said drum member includes at least one air duct extending generally axially through said reservoir from one end to the other having a wall exposed to the action of liquid in said reservoir, said duct being open at each end and terminating at one end of the drum member adjacent the periphery of the member and at the other end of the member in a region spaced radially inward an appreciable distance from the periphery of the drum member.

5. Liquid-cooled frictional mechanism including a rotatable member, said member having a generally annular liquid reservoir rotatable therewith, said reservoir having a portion of relatively large diameter, a cylindrical brake drum portion of smaller diameter than said reservoir portion, said drum portion having an external friction surface adapted to be engaged by an external contracting brake band and an opposite internal surface adapted to be engaged by a cooling liquid in the reservoir, and cooling liquid flow directing means in said reservoir including a continuous baffle in said reservoir concentric with the axis of rotation of the drum member, the baffle having a central cylindrical portion substantially coextensive with said internal surface of the brake drum portion with the outer surface of said cylindrical portion spaced radially inward from said internal surface, an annular portion at one end of the cylindrical portion of the baffle extending outward in the reservoir with the periphery of said annular baffle portion positioned substantially in the outermost portion of said reservoir, an annular baffle portion at the other end of said cylindrical baffle portion extending inwardly therefrom with the periphery of the last named annular baffle portion spaced radially inward from said internal surface of the brake drum portion, the baffle thus being Z-shaped in cross section, and cooling liquid passages at the outer periphery of the first named annular baffle portion and at the inner periphery of the second named annular baffle portion for conducting cooling liquid from one side of the baffle to the other at said peripheries.

References Cited in the file of this patent

UNITED STATES PATENTS

| | | |
|---|---|---|
| 1,131,810 | Zoller et al. | Mar. 16, 1915 |
| 1,894,001 | Myers | Jan. 10, 1933 |
| 1,990,882 | Sargent | Feb. 12, 1935 |
| 2,041,457 | Cautley | May 19, 1936 |
| 2,057,435 | Kimble | Oct. 13, 1936 |
| 2,317,528 | Hertich | Apr. 27, 1943 |
| 2,412,706 | Anderson | Dec. 17, 1946 |

FOREIGN PATENTS

| | | |
|---|---|---|
| 667,280 | Great Britain | Feb. 27, 1952 |
| 1,017,181 | France | Sept. 17, 1952 |